Figure 4:
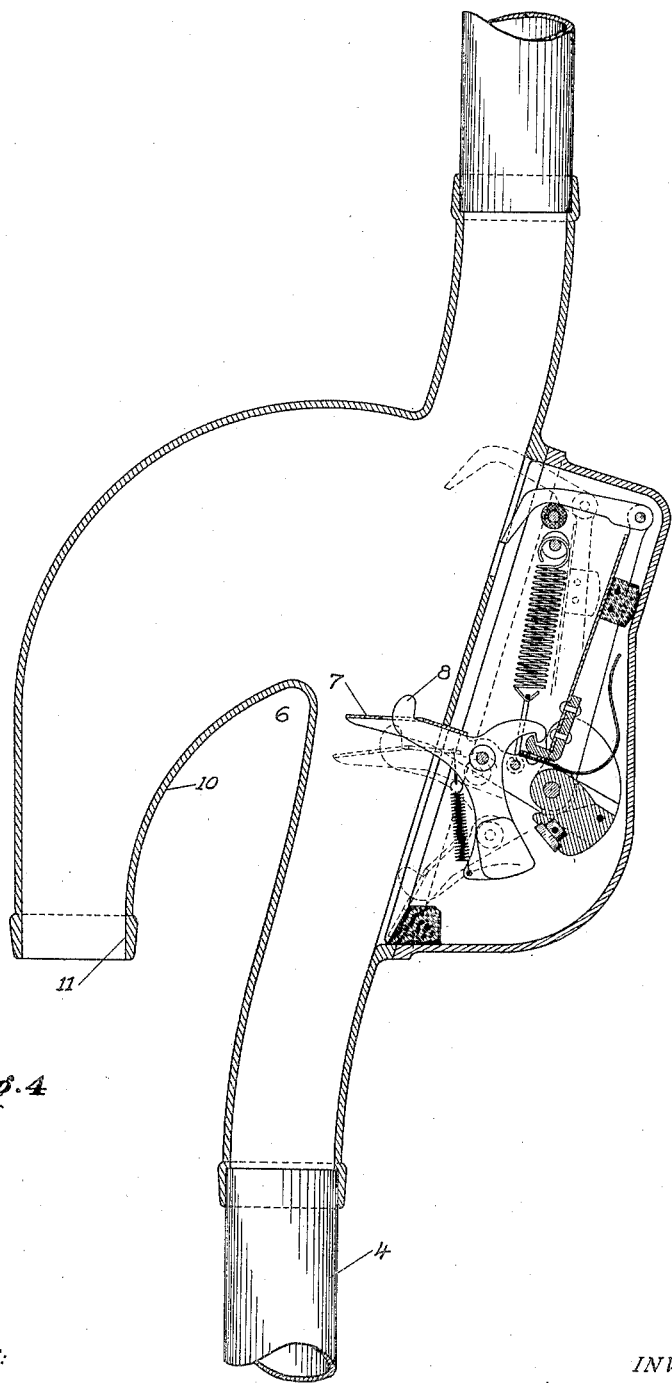

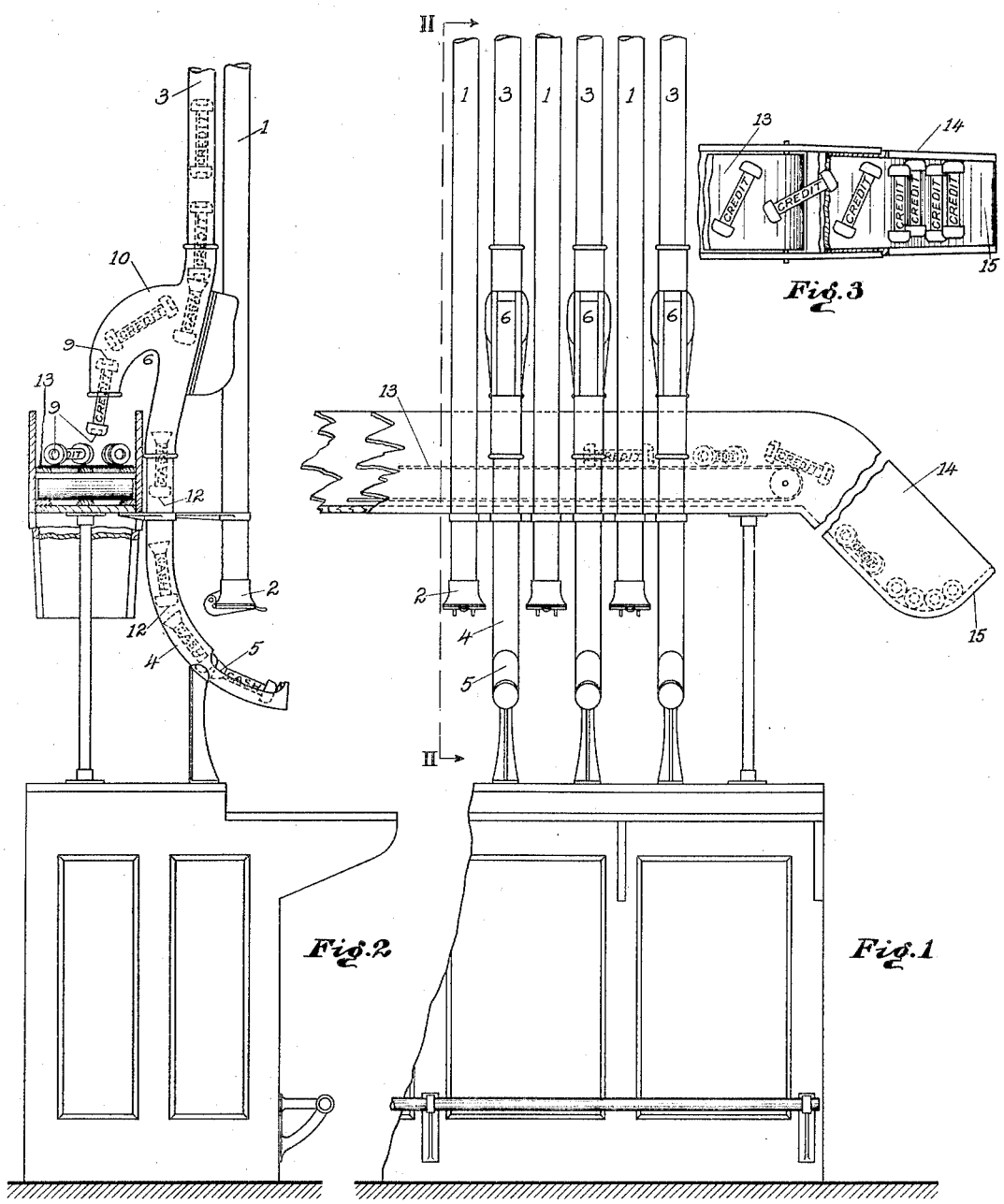

UNITED STATES PATENT OFFICE.

FREDERICK G. WHITTIER, OF BROOKLINE, MASSACHUSETTS, ASSIGNOR TO THE LAMSON COMPANY, OF BOSTON, MASSACHUSETTS, A CORPORATION OF NEW YORK.

PNEUMATIC-DESPATCH-TUBE SELECTIVE SYSTEM.

1,108,293.　　　　Specification of Letters Patent.　　Patented Aug. 25, 1914.

Application filed October 28, 1912.　Serial No. 728,048.

*To all whom it may concern:*

Be it known that I, FREDERICK G. WHITTIER, of Brookline, in the county of Norfolk and Commonwealth of Massachusetts, have invented certain new and useful Improvements in Pneumatic-Despatch-Tube Selective Systems, of which the following is a specification.

This invention relates to a pneumatic despatch tube selective system and has for one of its objects the provision of means whereby carriers of different classes (as for example those containing matter relating to cash sales and others containing data relating to credit sales) may be conveyed, indiscriminately intermixed, in a common conveying tube for a given distance and thereafter be automatically assorted and apportioned to suitable separate repositories in such manner that the precedence to which the preceding carriers in each class are entitled, is substantially maintained.

In installations of the type in question it has been customary heretofore to provide for the delivery of both cash and credit carriers to a common desk or station where they were sorted by hand, the credit carriers being then, and only then, despatched in a tube leading to the credit desk.

Credit customers are, in store practice, given precedence over those paying cash; the idea being to permit a party who has a charge account, and who is hence a regular customer, to receive his goods without being kept waiting. It is, however, necessary for the salesman to ascertain, and that, of course, very expeditiously, the status of the credit of such customer and the credit desk must hence be applied to. It is also extremely desirable that while the credit customer be given precedence over the cash customer, the proper precedence of one charge customer over another of the same class, and correspondingly of an earlier cash customer over a later cash customer, be maintained.

The attempt to keep the cash carriers in sequential order, as by dropping all carriers successively into an extension of the pneumatic tube, or other like acting repository, in the manner commonly heretofore resorted to, results in holding up the credit carriers, which are intermixed with the others. The means for obviating this or a like disadvantage forms the subject matter of the present disclosure. This and other objects of my invention will be hereinafter referred to and the novel elements and combinations of elements whereby they may be attained will be more particularly set forth in the claims appended hereto.

In the accompanying drawings which form a part hereof, I have exemplified a preferred form of apparatus adapted to effectuate the end in question, but as I am aware that various changes and modifications may be made therein without departing from the spirit of my invention, I desire to be limited only by the scope of said claims.

Referring to the drawings: Figure 1 is a side elevation of a portion of a pneumatic tube system equipped with apparatus adapted to effectuate the objects of the hereindescribed invention. Fig. 2 is a vertical transverse section taken on line II—II of Fig. 1. Fig. 3 is a fragmentary plan view of a credit carrier repository shown in side elevation in Fig. 1. Fig. 4 is a longitudinal section of a carrier switch adapted for use as an element of my apparatus.

As indicated in Fig. 1, any desired number of transmission tubes may be provided, the outgoing or sending tubes 1 being provided, in the present instance, with clapper valves 2, and the incoming or delivering tubes 3 being preferably provided with suitable repositories 4 at the lower ends thereof in which a certain limited number of carriers may accumulate. In order to insure that the carriers deposited in these receptacles 4 shall be removed therefrom in sequence, I provide an aperture 5, in the lower extremity of each of said receptacles, of just sufficient size to permit of the withdrawal of but one carrier at a time and that the lowermost one.

At a convenient point above the repository 4 in each tube, is a switch or sorting device 6 which constitutes a means for removing carriers of one class from the path of travel of the remaining carriers traversing such tube. A convenient form of the switch has been shown in Fig. 4. It is preferably of a well known type in which an obstructing member 7 is normally interposed in the path of all of the carriers but which member is provided with a releasing latch or trigger 8 adapted to be displaced with respect to the member 7 upon being struck by the head of a carrier adapted to engage the end of the latch while at the same time impinging upon said obstructing member. As the particular construction of this switch is known and since any operative switch of this type may be used in the system, I shall not further discuss the construction of the same.

In the exemplification of the system herein described, the credit carriers as indicated at 9 in Fig. 2, are each provided with recesses in the respective heads or ends thereof, so that such carriers are unable to trip the latch 8, and in consequence emerge from the switch casing 10 through the aperture 11. The cash carriers on the other hand are each provided with a non-recessed head, as indicated at 12 and such carriers in consequence trip the latch 8, releasing thereby the obstructing plate or member 7, and thereafter fall by gravity into the corresponding repository 4. The credit carriers emerging through the respective apertures 11 fall onto a belt conveyor 13, or the like, which delivers them in substantially proper sequence, in so far as each individual tube is concerned, and in approximate sequence, considering the group of tubes as a whole, to the final repository or receptacle for these carriers, which in the present instance is a chute 14 the lower end of which is closed, as at 15. The lateral walls of this chute preferably converge toward the closed extremity 15, and the bottom of the chute may be curled or curved up to form the closure. Hence, the carriers normally will each tend to arrange themselves laterally across the end of the chute and in proper sequence.

The respective switches and the collecting belt, which is common to all of the tubes, provide a plurality of means which co-act to selectively collect the credit carriers from the entire group of tubes and deliver these segregated carriers consecutively to the closed chute 14 at the credit station or desk; while the cash carriers, whose progress toward their respective repositories 4 has not been impeded by the selecting devices, are delivered sequentially to the respective openings 5 from which they are removed by the operatives at the cash station.

Having thus described my invention, what I claim is—

1. In pneumatic despatch tube apparatus, the combination of two classes of carriers with a pneumatic tube for conveying said carriers, carriers of one class being of different construction from and being normally indiscriminately interposed between carriers of the other class in said tube when in transit therethrough, a repository adapted to maintain carriers delivered thereto from said tube substantially in sequential order, means co-acting with carriers of one class to remove only said carriers from the path of travel of the remaining carriers so that the latter are delivered in uninterrupted sequence to said repository, and separate means for maintaining the so removed carriers in substantially proper sequence with respect to each other.

2. In pneumatic despatch tube apparatus, the combination of two classes of carriers with a pneumatic tube for conveying said carriers, carriers of one class being of different construction from and being normally indiscriminately interposed between carriers of the other class in said tube when in transit therethrough, a repository adapted to maintain carriers delivered thereto from said tube substantially in sequential order, means co-acting with carriers of one class from the path of travel of the remaining carriers so that the latter are delivered in uninterrupted sequence to said repository, and separate means, a portion at least of which is normally moving, for maintaining the so removed carriers in substantially proper sequence with respect to each other.

3. In pneumatic despatch tube apparatus, the combination of two distinct classes of carriers with a plurality of pneumatic tubes for conveying said carriers, carriers of said classes being normally indiscriminately intermixed when in course of transit through said tubes, repositories at the delivery ends of said tubes adapted to maintain carriers delivered thereto from the respective tubes, in substantially sequential order, means for removing carriers of one class from the respective tubes before said last mentioned carriers reach said repositories, so that the carriers of the remaining class will be disposed in uninterrupted sequence in said repositories, and means, common to substantially all of said tubes, for displacing the so removed carriers from each of said tubes, laterally with respect to the corresponding tube and substantially in the order received therefrom.

4. In pneumatic despatch tube apparatus, the combination of two distinct classes of carriers with a plurality of pneumatic tubes for conveying said carriers, carriers of said classes being normally indiscriminately intermixed when in course of transit through said tubes, repositories at the delivery ends of said tubes adapted to maintain carriers delivered thereto from the respective tubes, in substantially sequential order, means for removing carriers of one class from the respective tubes before said last mentioned carriers reach said repositories, so that the carriers of the remaining class will be disposed in uninterrupted sequence in said repositories and normally moving means, common to substantially all of said tubes, for displacing the so removed carriers from each of said tubes, laterally with respect to the corresponding tube and substantially in the order received therefrom.

5. In pneumatic despatch tube apparatus, the combination of two distinct classes of carriers with a plurality of pneumatic tubes for conveying said carriers, carriers of said classes being normally indiscriminately intermixed when in course of transit through said tubes, two stations, one for carriers of one class and the other for carriers of the other class, and a plurality of co-acting means, one of which is common to substantially all of said tubes, for selectively collecting from said tubes the carriers other than those destined for one of said stations and delivering these segregated carriers consecutively at the other of said stations.

6. In pneumatic despatch apparatus, the combination of two distinct classes of carriers with a pneumatic tube for conveying said carriers, carriers of said classes being normally indiscriminately intermixed when in course of transit through said tube, two stations, one for carriers of one class and the other for carriers of the other class, and a plurality of co-acting means for automatically selectively collecting from said tube carriers other than those destined for one of said stations and delivering these segregated carriers consecutively at the other of said stations.

7. In pneumatic despatch tube apparatus, the combination of two distinct classes of carriers with a plurality of pneumatic tubes for conveying said carriers, carriers of said classes being normally indiscriminately intermixed when in course of transit through said tubes, repositories at the delivery ends of said tubes adapted to maintain carriers delivered thereto from the respective tubes, in substantially sequential order, means for removing carriers of one class from the respective tubes before said last mentioned carriers reach said repositories, so that the carriers of the remaining class will be disposed in uninterrupted sequence in said repositories, and means, common to substantially all of said tubes, for displacing the so removed carriers from each of said tubes.

In testimony whereof I have affixed my signature, in the presence of two witnesses.

FREDERICK G. WHITTIER.

Witnesses:
C. H. CUTTING,
WM. W. BUCK.